US009021652B2

(12) United States Patent
Coemans et al.

(10) Patent No.: US 9,021,652 B2
(45) Date of Patent: May 5, 2015

(54) CONNECTING ELEMENT FOR THE ARTICULATED CONNECTION OF A WIPER BLADE TO A WIPER ARM

(75) Inventors: Wildrik Coemans, Borgloon (BE); David Van Baelen, Winksele (BE); Andreas Biank, Oberlauterbach (FR); Kris Coart, Landen (BE); Hans Beelen, Herk de Stad (BE); Eric Windmolders, Kermt (BE); Ernest Dekeyser, Scherpenheuvel (BE)

(73) Assignee: Robert Bosch GmbH, Stuttgart (DE)

(*) Notice: Subject to any disclaimer, the term of this patent is extended or adjusted under 35 U.S.C. 154(b) by 1660 days.

(21) Appl. No.: 12/527,734

(22) PCT Filed: Dec. 19, 2007

(86) PCT No.: PCT/EP2007/064175
§ 371 (c)(1), (2), (4) Date: Feb. 25, 2010

(87) PCT Pub. No.: WO2008/101561
PCT Pub. Date: Aug. 28, 2008

(65) Prior Publication Data
US 2010/0146727 A1 Jun. 17, 2010

(30) Foreign Application Priority Data

Feb. 19, 2007 (DE) .......................... 10 2007 008 145
May 11, 2007 (DE) .......................... 10 2007 022 185

(51) Int. Cl.
*B60S 1/40* (2006.01)
*B60S 1/38* (2006.01)

(52) U.S. Cl.
CPC ............ *B60S 1/4006* (2013.01); *B60S 1/3856* (2013.01); *B60S 1/387* (2013.01); *B60S 1/4016* (2013.01); *B60S 1/3867* (2013.01); *B60S 2001/4035* (2013.01)

(58) Field of Classification Search
USPC ...................................... 15/250.32
See application file for complete search history.

(56) References Cited

U.S. PATENT DOCUMENTS

| 7,628,560 | B2 | 12/2009 | Westermann et al. |
| 2002/0000018 | A1 | 1/2002 | Kotlarski et al. |
| 2008/0086830 | A1* | 4/2008 | Kim ........................... 15/250.32 |

FOREIGN PATENT DOCUMENTS

| DE | 4229127 | * | 3/1994 | ............... B60S 1/40 |
| DE | 19537854 | | 4/1997 | |

(Continued)

OTHER PUBLICATIONS

PCT/EP2007/064175 International Search Report.

*Primary Examiner* — Monica Carter
*Assistant Examiner* — Stephanie Berry
(74) *Attorney, Agent, or Firm* — Michael Best & Friedrich LLP

(57) ABSTRACT

The invention is based on a connecting element (36) for the articulated connection of a wiper blade (14) to a wiper arm (12) of a window wiper (10), wherein the connecting element (36) has a hub (50), which is open towards a vehicle window (16), for a bearing pin (26) fastened to the wiper blade (14), and at least one elastically flexible spring tongue (46) in order to keep the bearing pin (26) in the open hub (50), and the connecting element (36) furthermore has at least one bearing surface (60) in order to support it on a hook-shaped end (28) of the wiper arm (12). It is proposed that the hub (50) is open over half of its circumference, and the spring tongue (46), which blocks the opening of the hub (50) by means of a latching cam (48), yields elastically in the direction of the bearing surface (60), wherein the distance between the bearing surface (60) for the hook-shaped end (28) and the spring tongue (46) is dimensioned in such a manner that, in the fitted state, the hook-shaped end (28) blocks the spring tongue (46) in the direction of the bearing surface (60).

21 Claims, 3 Drawing Sheets

(56) References Cited

FOREIGN PATENT DOCUMENTS

| | | |
|---|---|---|
| DE | 19734843 | 2/1999 |
| EP | 0585811 | 3/1994 |
| JP | 2004074920 | 3/2004 |
| WO | 99/22971 | 5/1999 |
| WO | WO 9922971 A1 * | 5/1999 ................ B60S 1/40 |

* cited by examiner

CONNECTING ELEMENT FOR THE ARTICULATED CONNECTION OF A WIPER BLADE TO A WIPER ARM

BACKGROUND OF THE INVENTION

The invention is based on a connecting element for the articulated connection of a wiper blade to a wiper arm.

WO 99/22971 discloses a window wiper with a wiper arm and a wiper blade, wherein the wiper blade is connected in an articulated manner to the wiper arm via a connecting element. For this purpose, the connecting element has a hub which is open toward a vehicle window and comprises an articulation pin, which is fastened to the wiper blade, over more than half of a circumference. The hub is formed by two spring tongues which, when the connecting element is fitted onto the articulation pin, yield resiliently and latch the articulation pin in its end position. For easier fitting of the articulation pin, at the opening of the hub the spring tongues have slopes by means of which the opening expands outward. The open hub is arranged in the central region of the connecting element. In the longitudinal direction on both sides of the hub, said connecting element has, on the outer sides of its side walls, guide surfaces with which the connecting element is guided laterally in a joining element of the wiper blade. Between the side walls, bearing surfaces for a hook-shaped end of the wiper arm are located toward the wiper arm. Said hook-shaped end is of U shaped design in longitudinal section and fastened to flexible elements in latching holes or latching depressions on the wiper arm by means of latching lugs.

DE 195 37 854 A1 discloses a window wiper with a similar connecting element which has shafts in the longitudinal direction on both sides at a distance from the open hub, said shafts running transversely with respect to the longitudinal direction, and into which wiper-arm hooks which are bent over at right angles engage and latch to the connecting element. The distance of the shafts from the spring tongues of the hub is of a size such that the spring deflection of the spring tongues is not adversely affected by the hooks of the wiper arm.

The described window wipers have conventional wiper blades with a supporting bracket system, but wiper blades of flat construction are also known, for example from DE 137 64 843 A1, said wiper blades having at least one supporting element with a joining element which has a bearing pin for a hook-shaped end of a wiper arm. Such wiper blades are likewise suitable for connecting elements of this type, with the bearing pin being arranged above a wiper strip, but with it also being possible for it to protrude laterally over the joining element.

SUMMARY OF THE INVENTION

According to the invention, the hub is open over half of its circumference, and the spring tongue, which blocks the opening of the hub by means of a latching cam, yields elastically in the direction of the bearing surface. In this case, the distance between the bearing surface for the hook-shaped end and the spring tongue is dimensioned in such a manner that, in the fitted state, the hook-shaped end blocks the spring tongue in the direction of the bearing surface. In the case of the configuration according to the invention, the open hub itself does not need to yield elastically. It can therefore be designed to be very stiff, and therefore it can take over the guide tasks for the wiper blade in an optimum manner. In particular, the spring tongue has a retaining function for the bearing pin. Since the spring tongue is inhibited in its elastic flexibility in the fitted state by the hook-shaped end of the wiper arm, it can be designed as a soft spring element, as a result of which the bearing pin of the wiper blade can be fitted with little effort. By contrast, the forces for forcibly releasing the connecting element in the fitted state are extremely high without having to subject the spring tongue to an extreme load, since the latter is supported on the hook-shaped end of the wiper arm. The result is an easily fittable connection between wiper blade and wiper arm which cannot be automatically released during operation and the good guide properties of which are maintained even over a long service life.

A bearing bolt running parallel to the open hub expediently forms the bearing surface. The hook-shaped end of the wiper arm can be fitted onto said bearing bolt in a customary manner, with the wiper-arm end of the hook-shaped end being supported on a bridge of the connecting element, said bridge connecting the two side walls of the connecting element to each other. A partition, in which the spring tongue is provided, runs transversely with respect to the side walls of the connecting element between the open hub and the bearing bolt. The distance between the bearing bolt and the partition or the spring tongue is matched to the thickness of the hook-shaped end in such a manner that, when a hook-shaped end is fitted, the spring tongue can no longer yield in the direction of the bearing bolt and therefore, by means of its latching cam, blocks the open hub.

While the open hub is formed by corresponding openings in the side walls of the connecting element and therefore has, on account of its large axial extent, an optimum supporting width with good guide properties, the spring tongue lies between the side walls and is narrower than the axial extent of the open hub. It is expediently formed by two parallel slots in the partition. Its spring rigidity can be modified by means of its width and thickness. The latter are selected in such a manner that, on the one hand, sufficient strength is ensured and, on the other hand, the connecting element can be fitted onto the bearing pin of the wiper blade with little effort. In order to stiffen the open hub, in this region the connecting element has a top wall which connects the two side walls to each other.

According to a further embodiment of the invention, a bridge which connects the side walls and serves as a rest for the wiper arm is provided at that end of the connecting element which faces the wiper arm. As a result, the stability of the connecting element and therefore the guidance of the wiper blade are improved. It is advantageous in this case for the bridge to have two lateral side cheeks facing the joining element. Said side cheeks bear with their inner surfaces against the outer sides of the upper limb of the hook-shaped end of the wiper arm.

The side cheeks have gripping strips on their outer sides for better handling of the connecting element.

The connecting element according to the invention can advantageously be used in all wiper blades which have a bearing pin irrespective of whether the wiper arm runs above the wiper blade or offset laterally with respect thereto, and whether the wiper blade has a conventional construction or a flat construction.

The connecting element is expediently outwardly covered by a covering cap by the covering cap being clipped onto the joining element. The covering cap forms, between its side walls, a front wall and a rear end wall, an opening through which the connecting element can be unfolded in the fitted state, and therefore the hook-shaped end of the wiper arm can be fitted to the connecting element. A step which corresponds to the thickness of the hook-shaped end is advantageously provided between the upper edges of the side walls and the upper edge of the end wall of the covering cap. The extent of the step in the longitudinal direction corresponds to the extent of the side cheeks, and therefore, in the fitted state of the hook-shaped end, the opening of the covering cap upward is substantially covered by the upper limb of the hook-shaped end and the side cheeks of the connecting element, thus resulting in an advantageous, closed design which can be adapted to the particular application by means of individual shaping of the covering cap.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

Figure 1:
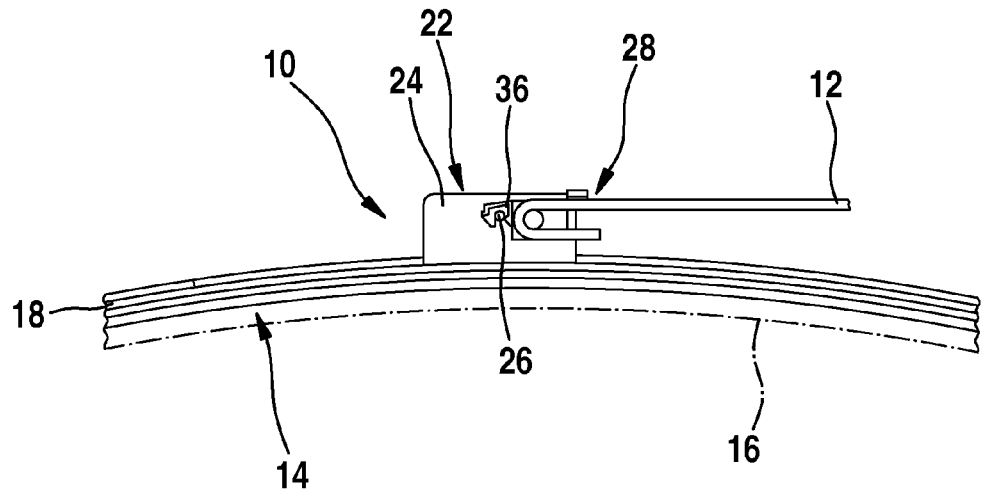
FIG. 1 shows a schematic partial view from the side of a window wiper with a connecting element according to the invention.

A window wiper 10 includes a wiper blade 14 which is connected in an articulated manner to a wiper arm 12. For this purpose, the wiper blade 14 has a joining element 22, the two side walls 24 of which, running in the longitudinal direction of the wiper blade 14, are connected to each other by a bearing pin 26. The joining element 22 is fastened to at least one supporting element 18 which is provided in or on a wiper strip 20 which is guided over a vehicle window 16 by the wiper arm 12.

A connecting element 36 is mounted on the bearing pin 26 by means of a hub 50 which is open toward the vehicle window 16. The opening of the hub 50 extends over half of the circumference of the bearing pin 26, and therefore the fitting can take place without elastic or plastic widening of the open hub 50. A top wall 54, which connects the side walls 38 of the connecting element 36 to each other, stiffens the hub 50. The connecting element 36 is secured on the bearing pin 26 by means of a spring tongue 46 with a latching cam 48 which projects into the open region of the hub 50 and, during the fitting, yields resiliently owing to the elasticity of the spring tongue 46. The spring tongue 46 is part of a partition 42 which connects the side walls 38 of the connecting element 36 to each other. Said spring tongue is delimited by two lateral slots 44 in the partition 42.

Figure 2:
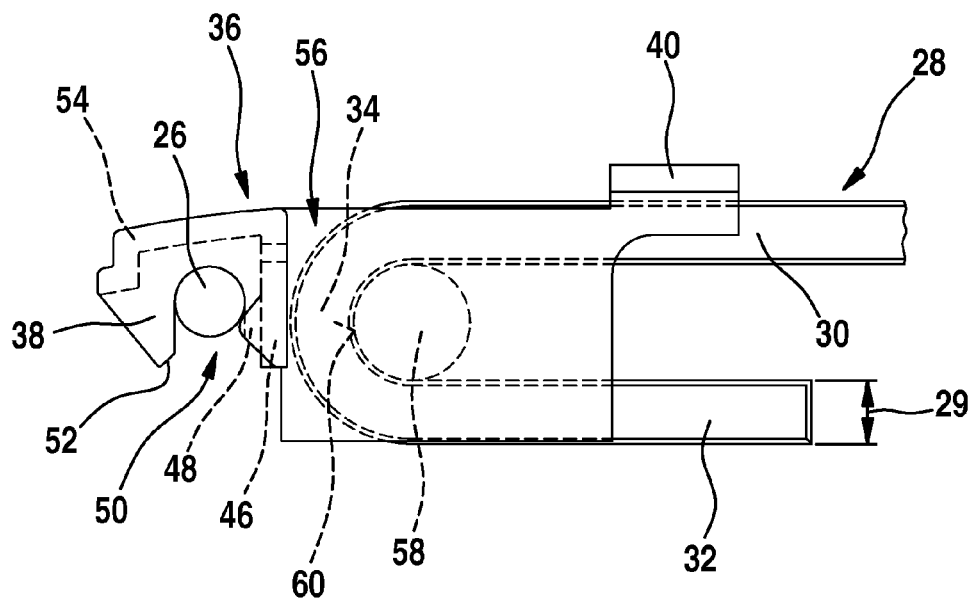
FIG. 2 shows a connecting element according to FIG. 1 on a wiper arm on an enlarged scale.
Figure 3:
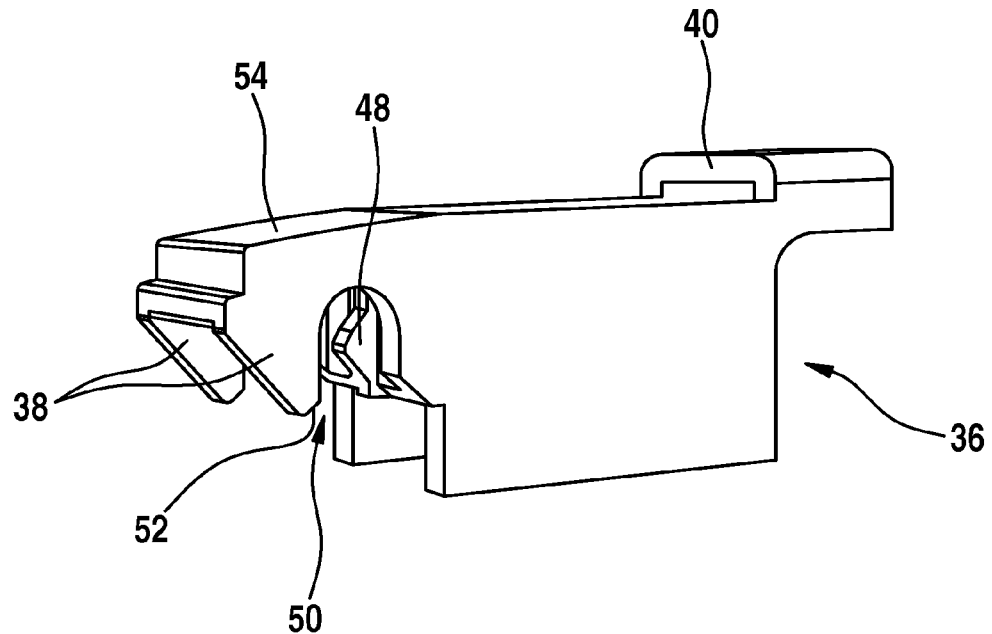
FIG. 3 shows a perspective view of a connecting element according to FIG. 1 obliquely from below.
Figure 4:
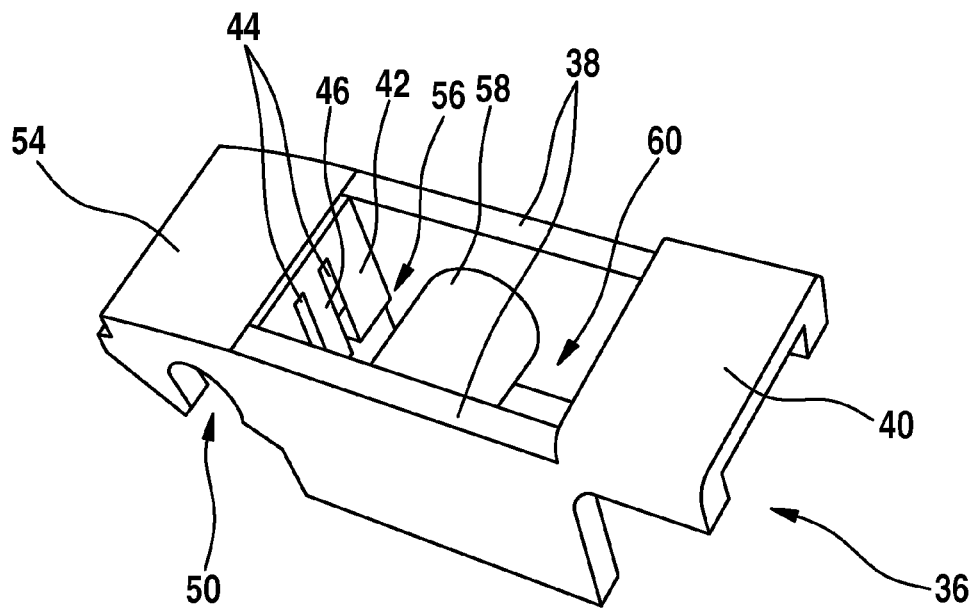
FIG. 4 shows a perspective view of a connecting element according to FIG. 1 obliquely from above.

A bearing bolt 58 which, on its circumference, has a bearing surface 60 for a hook-shaped end 28 of the wiper arm 12 is located at a distance on that side of the partition 42 which faces away from the bearing pin 26. The hook-shaped end 28 has an upper limb 30 and a lower limb 32 which are connected to each other via a curved component 34. In the fitted state (FIG. 2), the curved component 34 encompasses the bearing bolt 58, with the thickness 29 of the hook-shaped end 28 being dimensioned with respect to the distance between the spring tongue 46 and the bearing bolt 58 in such a manner that the outer circumference of the curved component 34 blocks the spring deflection of the spring tongue 46 in the direction of the bearing bolt 58 and of the bearing surface 60. In the fitted state, the hook-shaped end 28 is supported with its upper limb 30 on a bridge 40 which connects the side walls 38 of the connecting element 36 to each other at that end of said connecting element which faces the wiper arm 12.

During the fitting, which is made easier by slopes 52 in the region of the opening of the hub 50, the connecting element 36 is first of all clipped onto the bearing pin 26 and then the hook-shaped end 28 is first of all pushed by means of lifting and pivoting movements through an intermediate space 62 between the bearing bolt 58 and the bridge 40, and then the lower limb 32 of the hook-shaped end 28, which is curved in a U shaped manner, is threaded through an intermediate space 56 between the partition 42 or the spring tongue 46 and the bearing bolt 58 and is pivoted into its operating position by means of a pivoting movement. Instead of the hook-shaped end 28 which is bent in a U shaped manner, use can also be made of a hook-shaped end which is bent at right angles, is pushed into an intermediate space 56 correspondingly designed as a shaft and latches in a customary manner to the connecting element 36 by means of suitable latching means.

Figure 5:
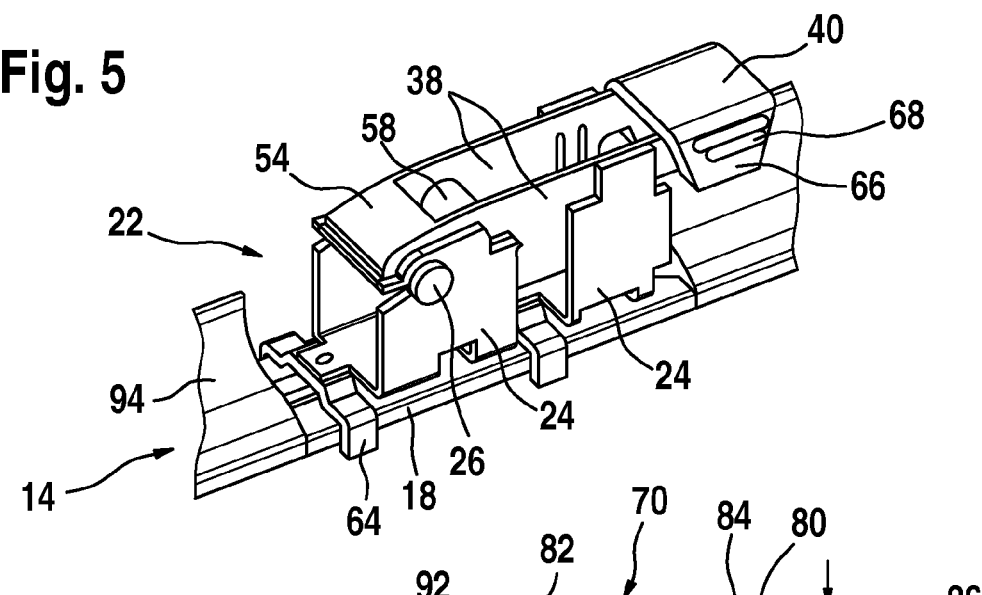
FIG. 5 shows a perspective view of a wiper blade with a variant of a connecting element.
Figure 6:
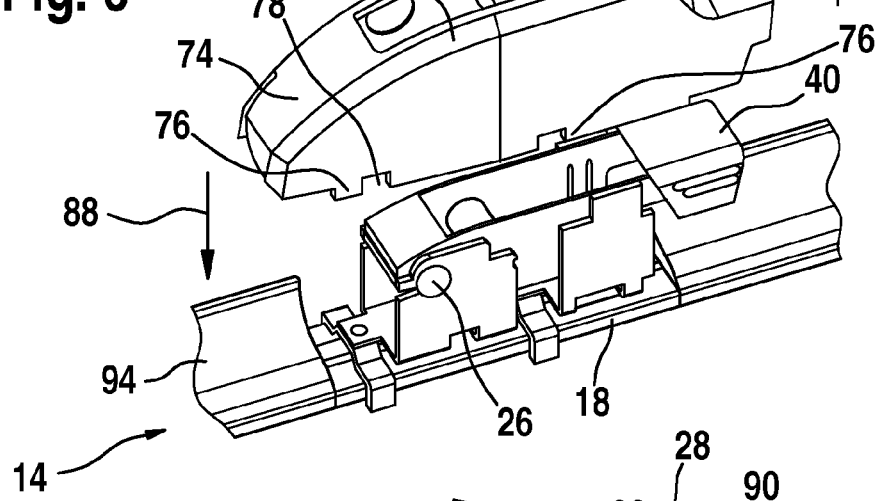
FIG. 6 shows a wiper blade according to FIG. 5 with a covering cap in an exploded illustration.
Figure 7:
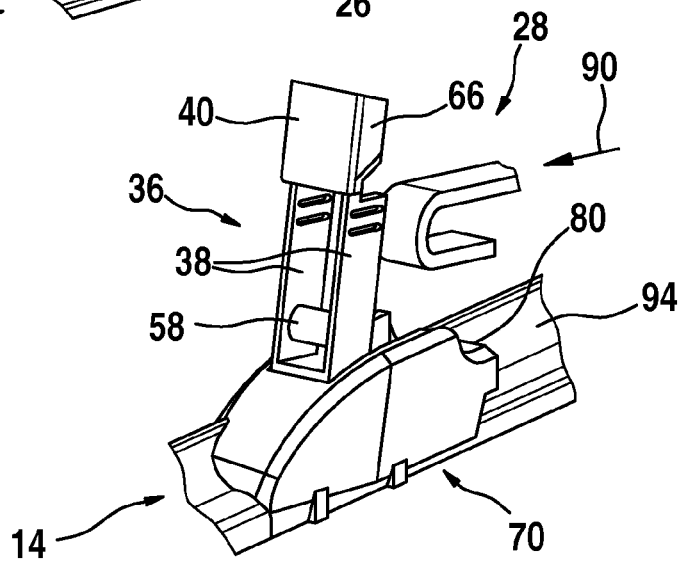
FIG. 7 shows a wiper blade according to FIG. 6 in the fitted state with the connecting element unfolded.

In the embodiment according to FIGS. 5 to 7, the joining element 22 is fastened to the supporting element 18 by means of claws 64. Furthermore, a clip spoiler 94 is attached to the supporting element 18 on both sides of the joining element 22. The bridge 40 of the connecting element 36, which bridge connects the side walls 38 to each other, has side cheeks 66 which face the joining element 22 and have gripping strips 68 on their outer sides. Said gripping strips make it easier to unfold the connecting element 36 into the fitting position (FIG. 7) for the hook-shaped end 28 of the wiper arm 12. In the fitted state, the side cheeks 66 bear against the outer sides of the hook-shaped end 28 and therefore improve the guidance of the wiper blade 14 and the design, in particular in conjunction with a covering cap 70.

The covering cap 70 is pushed in the fitting direction 88 over the joining element 22 and the connecting element 36 and is fastened to the supporting element 18 by means of retaining clips 76. Cutouts 78 on the lower edges of the side walls 72 of the covering cap 70 permit the claws 64 of the joining element 22 to end flush with the outer sides of the side walls 72. The latter are connected to each other by a front wall 74 and a rear end wall 80. An opening 92 is formed between the latter, through which the connecting element 36 can be unfolded in the fitted state for the fitting of the hook-shaped end 28 (FIG. 7). In the operating position, the opening 92 is substantially covered by the upper side of the hook-shaped end 28 and parts of the connecting element 36, in particular of the bridge 40 with its side cheeks 66. So that the hook-shaped end ends approximately flush with the upper edges 82 of the side walls 72, a step 86 which is matched to the thickness 29 of the hook-shaped end 28 is provided with respect to the upper edge 84 of the end wall 80. A closed design is thus produced in the fitted state of the hook-shaped end 28, and therefore the joining element 22 together with the joint 26, 50 is substantially protected against environmental influences. Irrespective of the functional parts, the design can be adapted visually to the respective use situation by means of the covering cap 70.

The hook-shaped end 28 is pushed in the fitting direction 90 between the side walls 38 of the open connecting element 36 and subsequently moved in the fitting direction 88 in order finally to be pushed over the bearing bolt 58 in the opposite direction to the fitting direction 90. The connecting element 36 is subsequently folded back into the operating position which runs approximately parallel to the wiper blade 14.

What is claimed is:

1. A wiper assembly, comprising:
 a wiper arm (12) of a window wiper (10), the wiper arm including a hook-shaped end with a curved portion having an outer circumference; and
 a connecting element (36) for an articulated connection of a wiper blade (14) to the wiper arm (12), the connecting element (36) including:
 a hub (50), which is open toward a vehicle window (16), for a bearing pin (26) fastened to the wiper blade (14);
 at least one elastically flexible spring tongue (46) in order to keep the bearing pin (26) in the open hub (50); and
 at least one bearing surface (60) to support the connecting element (36) on the hook-shaped end (28) of the wiper arm (12), wherein
 the hub (50) is open over half of its circumference, and the spring tongue (46), which blocks the opening of the hub (50) by a latching cam (48), yields elastically in a direction of the bearing surface (60), with a distance between the bearing surface (60) and the spring tongue (46) being dimensioned such that, in a fitted state, the outer circumference of the hook-shaped end (28) blocks the spring tongue (46) in the direction of the bearing surface (60).

2. The wiper assembly as claimed in claim 1, characterized in that a bearing bolt (58) running parallel to the open hub (50) forms the bearing surface (60), and a partition (42), in which the spring tongue (46) is provided, runs between the open hub (50) and the bearing bolt (58), and said partition is at a distance from the bearing bolt (58), which distance matches a thickness (29) of the hook-shaped end (28).

3. The wiper assembly as claimed in claim 1, characterized in that the spring tongue (46) is narrower than an axial extent of the open hub (50).

4. The wiper assembly as claimed in claim 3, characterized in that the spring tongue (46) is formed by two parallel slots (44) in the partition (42).

5. The wiper assembly as claimed in claim 1, characterized in that the open hub (50) is provided in side walls (38) of the connecting element (36), and a top wall (54) connects the side walls (38) to each other on a side facing away from the opening of the hub (50).

6. The wiper assembly as claimed in claim 1, characterized in that a bridge (40) which connects side walls (38) and serves as a rest for the wiper arm (12) is provided at an end of the connecting element (36) which faces the wiper arm (12).

7. The wiper assembly as claimed in claim 6, characterized in that the bridge (40) has two lateral side cheeks (66) facing a joining element (22).

8. The wiper assembly as claimed in claim 7, characterized in that the side cheeks (66) have gripping strips (68) on their outer sides.

9. A wiper assembly, comprising:
 a wiper arm (12) of a window wiper (10), the wiper arm including a hook-shaped end with a curved portion; and
 a connecting element (36) for an articulated connection of a wiper blade (14) to the wiper arm (12), the connecting element (36) including:
 a hub (50), which is open toward a vehicle window (16), for a bearing pin (26) fastened to the wiper blade (14);
 at least one elastically flexible spring tongue (46) in order to keep the bearing pin (26) in the open hub (50); and
 at least one bearing surface (60) in order to support the connecting element on the hook-shaped end (28) of the wiper arm (12), wherein
 the hub (50) is open over half of its circumference, and the spring tongue (46), which blocks the opening of the hub (50) by a latching cam (48), yields elastically in a direction of the bearing surface (60), with a distance between the bearing surface (60) and the spring tongue (46) being dimensioned such that, in a fitted state, the curved portion of the hook-shaped end (28) encompasses the bearing surface and blocks the spring tongue (46) in the direction of the bearing surface (60).

10. A wiper assembly as claimed in claim 9, characterized in that a covering cap (70) is clipped onto a joining element (22), said covering cap forming, between its side walls (72), a front wall (74) and a rear end wall (80), an opening (92) through which the connecting element (36) can be unfolded in the fitted state.

11. The wiper assembly as claimed in claim 10, characterized in that a step (86) which corresponds to a thickness (29) of the hook-shaped end (28) is provided between upper edges (82) of the side walls (72) and an upper edge (84) of the end wall (80), with the extent of the step (86) in a longitudinal direction corresponding to the extent of the side cheeks (66).

12. The wiper assembly as claimed in claim 2, characterized in that the spring tongue (46) is narrower than an axial extent of the open hub (50).

13. The wiper assembly as claimed in claim 12, characterized in that the spring tongue (46) is formed by two parallel slots (44) in the partition (42).

14. The wiper assembly as claimed in claim 13, characterized in that the open hub (50) is provided in side walls (38) of the connecting element (36), and a top wall (54) connects the side walls (38) to each other on a side facing away from the opening of the hub (50).

15. The wiper assembly as claimed in claim 14, characterized in that a bridge (40) which connects side walls (38) and serves as a rest for the wiper arm (12) is provided at an end of the connecting element (36) which faces the wiper arm (12).

16. The wiper assembly as claimed in claim 15, characterized in that the bridge (40) has two lateral side cheeks (66) facing a joining element (22).

17. The wiper assembly as claimed in claim 16, characterized in that the side cheeks (66) have gripping strips (68) on their outer sides.

18. A wiper assembly, comprising:
 a wiper arm (12) of a window wiper (10), the wiper arm having a hook-shaped end (28); and
 a connecting element (36) for an articulated connection of a wiper blade (14) to the wiper arm (12), the connecting element (36) having:
 a hub (50), which is open toward a vehicle window (16), for a bearing pin (26) fastened to the wiper blade (14);
 at least one elastically flexible spring tongue (46) configured to bear against the bearing pin (26) to keep the bearing pin (26) in the open hub (50); and
 at least one bearing surface (60) to support the connecting element (36) on the hook-shaped end (28) of the wiper arm (12), wherein
 the hub (50) is open over half of its circumference, and the spring tongue (46), which blocks the opening of the hub (50) by a latching cam (48), yields elastically in a direction of the bearing surface (60), with a distance between the bearing surface (60) and the spring tongue (46) being dimensioned such that, in a fitted state, the hook-shaped end (28) extends between the bearing surface and the spring tongue and blocks the spring tongue (46) in the direction of the bearing surface (60).

19. The wiper assembly as claimed in claim 18, wherein the hook-shaped end has a curved portion with an outer circumference that engages the spring tongue and blocks the spring tongue in the direction of the bearing surface.

20. The wiper assembly as claimed in claim 18, wherein the hook-shaped end has a curved portion that encompasses the bearing surface and engages the spring tongue and blocks the spring tongue in the direction of the bearing surface.

21. The wiper assembly as claimed in claim 9, characterized in that a bearing bolt (58) running parallel to the open hub (50) forms the bearing surface (60), and the curved portion of the hook-shaped end encompasses the bearing bolt (58) in the fitted state.

\* \* \* \* \*